United States Patent
Lee et al.

(10) Patent No.: US 10,086,643 B2
(45) Date of Patent: Oct. 2, 2018

(54) CHIP WITH STEREOSCOPIC TEXTURE FOR RESIN-BASED REINFORCED NATURAL STONE AND RESIN-BASED REINFORCED NATURAL STONE CONTAINING THE SAME

(71) Applicant: Lotte Advanced Materials Co., Ltd., Yeosu-si (KR)

(72) Inventors: Hee Cheol Lee, Uiwang-si (KR); Han Ju Kang, Uiwang-si (KR); Cheol Yeon Hwang, Uiwang-si (KR); Ki Cheon Kang, Uiwang-si (KR); Chang Ho Son, Uiwang-si (KR); Sung Jin An, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 514 days.

(21) Appl. No.: 14/538,076

(22) Filed: Nov. 11, 2014

(65) Prior Publication Data

US 2015/0344377 A1 Dec. 3, 2015

(30) Foreign Application Priority Data

May 30, 2014 (KR) ........................ 10-2014-0065544

(51) Int. Cl.
  *B44F 9/04* (2006.01)
  *C04B 26/18* (2006.01)
  (Continued)

(52) U.S. Cl.
  CPC .............. *B44F 9/04* (2013.01); *C04B 18/022* (2013.01); *C04B 26/18* (2013.01);
  (Continued)

(58) Field of Classification Search
  CPC ......... B44F 9/04; C04B 26/18; C04B 18/022; C04B 2111/542; Y10T 428/2993; Y10T 428/2991; Y10T 428/24388
  See application file for complete search history.

(56) References Cited

U.S. PATENT DOCUMENTS

| | | | |
|---|---|---|---|
| 4,269,869 A * | 5/1981 | Morohashi | C04B 41/4857 427/492 |
| 2006/0138385 A1* | 6/2006 | Yamanashi | B32B 27/04 252/301.36 |

(Continued)

FOREIGN PATENT DOCUMENTS

| KR | 10-0555441 B1 | 2/2006 |
|---|---|---|
| KR | 10-2011-0052425 A | 5/2011 |

(Continued)

OTHER PUBLICATIONS

Office Action in counterpart Korean Application No. 10-2014-0065544 dated Nov. 16, 2016, pp. 1-6.

*Primary Examiner* — Nathan L Van Sell
(74) *Attorney, Agent, or Firm* — Additon, Higgins & Pendleton, P.A.

(57) ABSTRACT

Provided are a chip with a stereoscopic texture for a resin-based reinforced natural stone and a resin-based reinforced natural stone including the same. A chip with a stereoscopic texture can be obtained by coating a pigment on a surface of a crushed reinforced natural stone chip. In a resin-based reinforced natural stone to which the chip with a stereoscopic texture is added, a boundary surface between the chip and a matrix is formed, such that a texture of natural stone and a three-dimensional stereoscopic effect may be implemented, thereby making it possible to implement an aesthetically beautiful surface.

10 Claims, 1 Drawing Sheet

(51) Int. Cl.
*C04B 18/02* (2006.01)
*C04B 111/54* (2006.01)

(52) U.S. Cl.
CPC .. *C04B 2111/542* (2013.01); *Y10T 428/24388* (2015.01); *Y10T 428/2991* (2015.01); *Y10T 428/2993* (2015.01)

(56) References Cited

U.S. PATENT DOCUMENTS

| | | | | |
|---|---|---|---|---|
| 2010/0105798 | A1* | 4/2010 | Hasegawa | C08F 299/00 522/99 |
| 2011/0111141 | A1* | 5/2011 | Jeong | C04B 20/1037 428/15 |
| 2011/0263783 | A1* | 10/2011 | Son | C04B 14/285 524/519 |
| 2013/0168607 | A1* | 7/2013 | Lee | B44F 9/04 252/301.36 |

FOREIGN PATENT DOCUMENTS

| | | |
|---|---|---|
| KR | 2012-0064233 A | 6/2012 |
| KR | 2013-0010143 A | 1/2013 |

\* cited by examiner

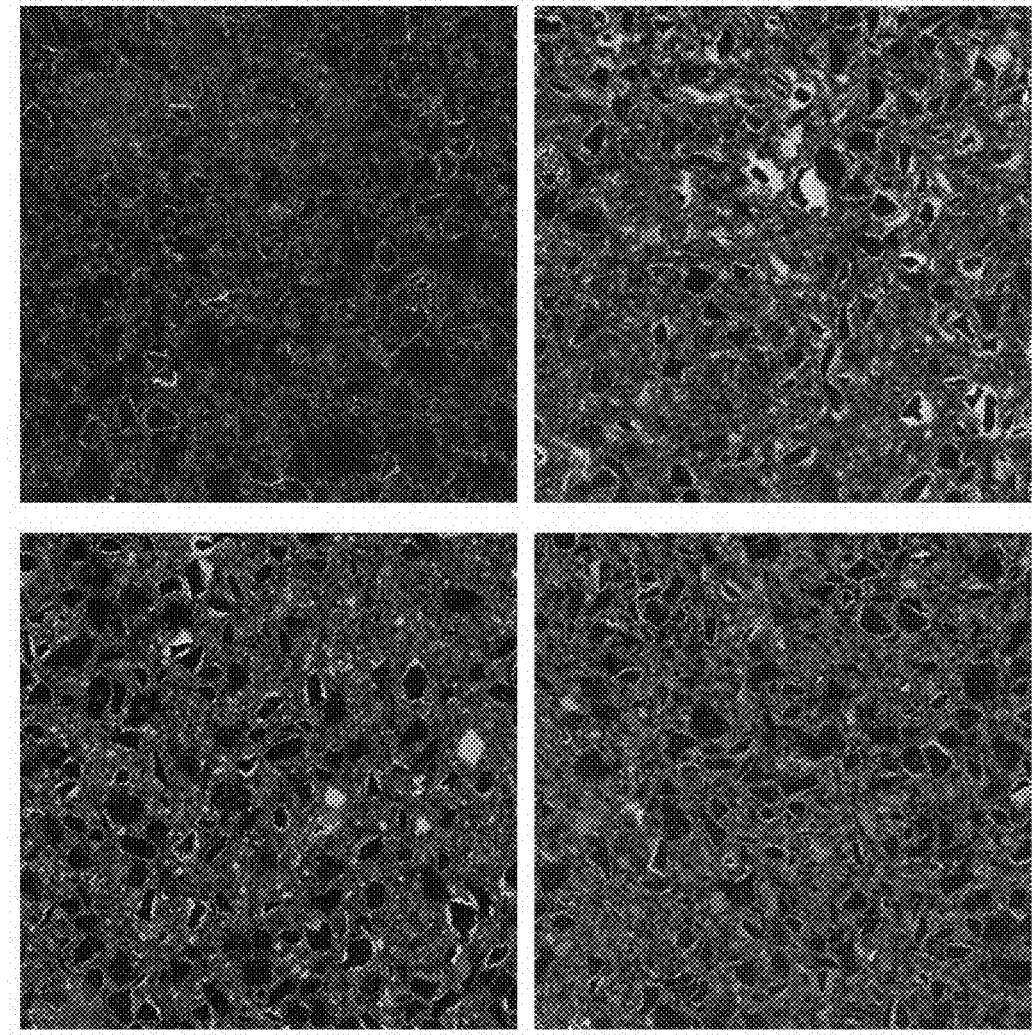

CHIP WITH STEREOSCOPIC TEXTURE FOR RESIN-BASED REINFORCED NATURAL STONE AND RESIN-BASED REINFORCED NATURAL STONE CONTAINING THE SAME

CROSS-REFERENCE TO RELATED APPLICATIONS

This application claims priority under 35 U.S.C. § 119 to Korean Patent Application No. 10-2014-0065544, filed on May 30, 2014, in the Korean Intellectual Property Office, the disclosure of which is incorporated herein by reference in its entirety.

FIELD OF THE INVENTION

The following disclosure relates to a chip with a stereoscopic texture for a resin-based reinforced natural stone and a resin-based reinforced natural stone containing the same.

BACKGROUND

Natural stones such as granite or marble have been used for interior building materials due to their beautiful surface patterns. Recently, natural stone has been spotlighted as a material having a high quality texture, such that demand for natural stone has significantly increased for use as a flooring material, a wall material, a sink top plate material, and the like.

Natural stone, however, has not been popularized due to disadvantages such as high cost, a heavy weight, weakness against impact in spite of a high surface hardness and beautiful patterns. Accordingly, various kinds of artificial stones have been developed.

Artificial stone may have various images and patterns unlike natural stone, may have an excellent gloss, and may be significantly resistant against extreme temperature change. In addition, since water absorption rate is low, and strength is high, artificial stone may provide an excellent interior effect in high-end houses, hotels, apartments, and the like, such that a demand for artificial stone has rapidly increased around the world.

In general, artificial stone can be classified into two types. One is a general artificial marble manufactured by adding various additives such as an inorganic filler, a coloring agent, a curing agent, and the like, to an acrylic resin or an unsaturated polyester-based resin. The other is a resin-based reinforced natural stone (also referred to as an engineered stone) manufactured by vibration-compression or vacuum vibration-compression molding a composition obtained by mixing an inorganic-based (silica-based) natural mineral and a binder resin to thereby have a texture of natural stone as it is.

The resin-based reinforced natural stone may be manufactured so as to have various colors and textures according to the kinds of mixed natural minerals, color of the binder resin and/or pigment, a stirring process, and the like. Since natural mineral is used as a raw material, the resin-based reinforced natural stone can have excellent natural textures as compared to general artificial marble, such that demand thereof has significantly increased.

The resin-based reinforced natural stone as described above may be manufactured so as to have a single color, manufactured so as to have multi-tones by adding different pigments, or manufactured so as to have a natural stone textile by using a chip.

However, most of the resin-based reinforced natural stones as described above have a two-dimensional pattern, a saturation thereof is not high, and interfaces thereof are not distinguished, such that it is difficult to have a stereoscopic texture. Occasionally, there is a natural stone having a particular and stereoscopic pattern, but this natural stone is scarce. Therefore, this natural stone has been traded at high cost in accordance with the scarcity.

A method of manufacturing a resin-based reinforced natural stone capable of simultaneously imparting a stereoscopic effect and a planar effect by polishing a surface of the resin-based reinforced natural stone step by step in order to conspicuously express the stereoscopic effect has been disclosed in Korean Patent Laid-Open Publication No. 2013-0010143.

However, since the stereoscopic effect of the resin-based reinforced natural stone itself is unnoticeable, there is a limitation in implementing a desired stereoscopic texture only by polishing the surface.

A method of manufacturing an engineered stone containing silica pretreated in order to improve whiteness of a resin-based reinforced natural stone itself has been disclosed Korean Patent Laid-Open Publication No. 2012-0064233. However, there is a limitation in that even though whiteness is improved, the stereoscopic texture is not improved.

Therefore, there is a need for a resin-based reinforced natural stone capable of exhibiting a natural stone texture by reflecting a stereoscopic effect of the resin-based reinforced natural stone itself without a complicated surface polishing process.

SUMMARY

An embodiment of the present invention is directed to providing a chip with a stereoscopic texture for a resin-based reinforced natural stone capable of implementing a three-dimensional stereoscopic texture by emphasizing a pattern like natural stone, saturation contrast, and a boundary of a point pattern without performing a separate surface polishing process for implementing a stereoscopic effect, and a resin-based reinforced natural stone including the same. For example, an embodiment of the present invention is directed to providing a chip with a stereoscopic texture for a resin-based reinforced natural stone capable of having a natural texture like a natural stone by coating a pigment on surface of a resin-based reinforced natural stone chip crushed to a predetermined size using a binder coating agent to prepare the chip with a stereoscopic texture, and capable of emphasizing a boundary with a matrix using the chip with a stereoscopic texture as a point chip. Another embodiment of the present invention is directed to providing a chip with a stereoscopic texture for a resin-based reinforced natural stone capable of having a more luxurious feeling by maximizing the stereoscopic texture using a saturation contrast. Other embodiments relate to a chip with a stereoscopic texture for a resin-based reinforced natural stone capable of implementing a beautiful surface by imparting a texture like natural stone and a three-dimensional stereoscopic effect with a boundary surface formed between the chip and a matrix, and a resin-based reinforced natural stone including the chip with a stereoscopic texture.

Another embodiment of the present invention is directed to providing a resin-based reinforced natural stone capable of implementing a stereoscopic texture by including the above-mentioned chip with a three-dimensional stereoscopic texture for a resin-based reinforced natural stone.

Another embodiment of the present invention is directed to providing a method of manufacturing the above-mentioned resin-based reinforced natural stone.

In one embodiment, a chip with a stereoscopic texture for a resin-based reinforced natural stone includes: a resin-based reinforced natural stone chip; a binder coating agent; and a pigment, wherein the binder coating agent and the pigment are coated on a surface of a resin-based reinforced natural stone chip crushed to a predetermined size.

The chip with a stereoscopic texture for a resin-based reinforced natural stone may include about 1 to about 3 parts by weight of the binder coating agent and about 0.5 to about 3 parts by weight of the pigment, based on about 100 parts by weight of the resin-based reinforced natural stone chip.

The resin-based reinforced natural stone chip may include about 10 to about 30 wt % of an unsaturated polyester resin, about 40 to about 60 wt % of a sand type silica-based inorganic material, and about 15 to about 35 wt % of a powder type silica-based inorganic material.

The resin-based reinforced natural stone chip may have an average particle size of about 5.0 to about 20.0 mm.

The binder coating agent may be an acrylic resin and/or urethane-based resin and may have a weight average molecular weight of about 20,000 to about 70,000 g/mol.

The resin-based reinforced natural stone chip may have a surface hardness of about 80 or more and a surface roughness (Ra) less than about 1.0 μm.

In another embodiment, a resin-based reinforced natural stone having an improved stereoscopic texture includes: about 1 to about 20 wt % of the chip with a stereoscopic texture for a resin-based reinforced natural stone; about 5 to about 15 wt % of an unsaturated polyester resin; and about 70 to about 93 wt % of a silica-based inorganic material.

The silica-based inorganic material may include: a sand type silica-based inorganic material having an average particle size of about 0.1 to about 1.2 mm; a powder type silica-based inorganic material having an average particle size less than about 45 μm; and a quartz chip having an average particle size of about 1 to about 9 mm.

The resin-based reinforced natural stone may further include one or two or more additives selected from a curing agent, a curing accelerator, a crosslinking agent, an organic/inorganic pigment, a leveling agent, a UV absorber, a storage stabilizer, a polymerization inhibitor, a frame retardant, and/or an antistatic agent.

The resin-based reinforced natural stone may have a surface hardness of about 80 to about 90 and a surface roughness (Ra) less than about 1 μm.

In other exemplary embodiments, a method of manufacturing a resin-based reinforced natural stone having an improved stereoscopic texture includes: (a) preparing a resin-based reinforced natural stone chip composition including about 10 to about 30 wt % of an unsaturated polyester resin, about 40 to about 60 wt % of a sand type silica-based inorganic material, and about 15 to about 35 wt % of a powder type silica-based inorganic material; (b) manufacturing a resin-based reinforced natural stone chip by curing and crushing the resin-based reinforced natural stone chip composition; (c) manufacturing a chip with a stereoscopic texture for a resin-based reinforced natural stone by mixing and curing the resin-based reinforced natural stone chip with a binder coating agent and a pigment; (d) preparing a resin-based reinforced natural stone composition by mixing about 1 to about 20 wt % of the chip with a stereoscopic texture for a resin-based reinforced natural stone, about 5 to about 15 wt % of an unsaturated polyester resin, and about 70 to about 93 wt % of a silica-based inorganic material; and (e) manufacturing a resin-based reinforced natural stone by vibration-compression molding the resin-based reinforced natural stone composition.

In the manufacturing of the chip with a stereoscopic texture for a resin-based reinforced natural stone, the curing may be performed at a temperature of about 90 to about 150° C. for about 20 to about 30 minutes.

Other features and aspects will be apparent from the following detailed description, the drawings, and the claims.

BRIEF DESCRIPTION OF THE DRAWINGS

FIGS. 1(a)-(d) are digital photographs of resin-based reinforced natural stones manufactured according to the Examples described herein.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a chip with a stereoscopic texture for a resin-based reinforced natural stone and a resin-based reinforced natural stone including the same according to the present invention will be described in detail. The exemplary embodiments of the present invention to be described below are provided by way of example so that the idea of the present invention can be sufficiently transferred to those skilled in the art to which the present invention pertains. Herein, technical terms and scientific terms used in the present specification have the general meaning understood by those skilled in the art to which the present invention pertains unless otherwise defined, and a description for the known function and configuration obscuring the present invention will be omitted in the following description.

In the present invention, the term "average particle size" means an average value of the maximum length and the minimum length of particles. The average particle size in the present invention is measured using standard sieves. In general, an average particle size of aggregate is measured based on the standard sieves (mesh). Here, the standard sieves have mesh sizes of 0.1 mm (#150 mesh), 1.2 mm (#16 mesh), and 0.045 mm (#325 mesh), respectively. Further, in the present invention, "a weight average molecular weight" (unit: g/mol) is measured using a gel permeation chromatography (GPC; Lient Technologies 1200 series) after dissolving a powder sample in tetrahydrofuran (THF). At this time, Shodex LF-804 (8.0.1.D.x300 mm) was used as a column, and polystyrene (Shodex) was used as a standard sample.

The present inventors studied in order to develop a resin-based reinforced natural stone chip capable of expressing a stereoscopic texture like natural stone. As a result, the present inventors found that in the case of preparing a chip with a stereoscopic texture by coating a binder coating agent and a pigment on a surface of the resin-based reinforced natural stone chip and preparing a resin-based reinforced natural stone including the same, a boundary of a pattern may be emphasized due to the chip with a stereoscopic texture serving as a point chip, such that a pattern like natural stone and a three-dimensional stereoscopic texture may be implemented, and moisture resistance and contamination resistance may be improved without deteriorating mechanical properties, thereby completing the present invention.

Hereinafter, each component will be described in more detail.

Chip with Stereoscopic Texture for Resin-Based Reinforced Natural Stone

The chip with a stereoscopic texture for a resin-based reinforced natural stone according to the present invention includes a resin-based reinforced natural stone chip, a binder coating agent, and a pigment, and may be manufactured by coating the binder coating agent and the pigment on a surface of the resin-based reinforced natural stone chip crushed to a predetermined size.

The resin-based reinforced natural stone chip according to an exemplary embodiment of the present invention may include an unsaturated polyester resin, a sand type silica-based inorganic material, and a powder type silica-based inorganic material.

The unsaturated polyester resin (UPR) according to the present invention can have excellent bonding strength with silica-based reinforced natural stone, such that in the case of forming the resin-based reinforced natural stone together with the sand type silica-based inorganic material and the powder type silica-based inorganic material, the unsaturated polyester resin may serve to improve mechanical properties.

As the unsaturated polyester resin used in the present invention, a resin generally known in the art may be used. Generally, the unsaturated polyester resin is an esterification reaction product of a polybasic acid and polyhydric alcohol, wherein the polybasic acid and/or polyhydric alcohol compound may include an unsaturated moiety.

As the polybasic acid, a polycarboxylic acid, a polycarboxylic acid anhydride, a polycarboxylic halide, and/or a polycarboxylic acid ester may be used. Examples of the polycarboxylic acid may include without limitation maleic acid, maleic acid anhydride, fumaric acid, chloromaleic acid, ethyl maleic acid, itaconic acid, citraconic acid, zeronic acid, mesaconic acid, aconic acid, acetylene dicarboxylic acid, and the like, and mixtures thereof. In addition, phthalic acid, isophthalic acid, terephthalic acid, and/or succinic acid which are generally used to prepare a polyester resin, or a mixture thereof may be used, but the present invention is not limited thereto.

As the polyhydric alcohol, a dihydric alcohol, trihydric alcohol and/or tetrahydric alcohol may be used. Examples of the dihydric alcohol may include without limitation ethylene glycol, diethylene glycol, propylene glycol, dipropylene glycol, 1,3-butanediol, 1,6-hexanediol, neopentyl glycol, 1,4-cyclohexanediol, and the like, and mixtures thereof. Examples of a trihydric alcohol may include without limitation glycerin, and the like. Examples of a tetrahydric alcohol may include without limitation pentaerythritol, and the like. The foregoing can be used singly or as a mixture thereof. In addition, examples of an unsaturated polyhydric alcohol may include without limitation butendiol, pentenediol, allyl or vinyl glycerol ether, allyl or vinyl pentaerythritol, and the like, and mixtures thereof.

The unsaturated polyester resin may have a weight average molecular weight of about 70,000 to about 100,000 g/mol. When the weight average molecular weight is in the above-mentioned range, the bonding strength with the silica-based inorganic material can be improved, such that excellent flatness and sanding property may be maintained during a surface polishing process, or the like. In the case in which the weight average molecular weight of the unsaturated polyester resin is less than about 70,000 g/mol, a detachment phenomenon of the silica-based inorganic material may occur, and in the case in which the weight average molecular weight is more than about 100,000 g/mol, viscosity can be excessively increased, and moldability may be deteriorated.

The resin-based reinforced natural stone chip composition may include the unsaturated polyester resin in an amount of about 10 to about 30 wt %, for example about 20 to about 25 wt %, based on a total weight (100 wt %) of a resin-based reinforced natural stone chip composition. In some embodiments, the resin-based reinforced natural stone chip composition may include the unsaturated polyester resin in an amount of about 10, 11, 12, 13, 14, 15, 16, 17, 18, 19, 20, 21, 22, 23, 24, 25, 26, 27, 28, 29, or 30 wt %. Further, according to some embodiments of the present invention, the amount of the unsaturated polyester resin can be in a range from about any of the foregoing amounts to about any other of the foregoing amounts.

The unsaturated polyester resin is included in an amount within the above-mentioned range, such that bonding strength with the silica-based inorganic material may be improved, and appearance and texture of natural stone may be effectively implemented.

The sand type silica-based inorganic material according to the present invention may be added in order to implement a texture and mechanical properties similar to those of natural stone.

In the present invention, the sand type silica-based inorganic material and the powder type silica-based inorganic material are divided by average particle size. The sand type silica-based inorganic material and the powder type silica-based inorganic material and are not the same.

The sand type silica-based inorganic material may have an average particle size of about 0.1 to about 1.2 mm, for example about 0.1 to about 0.5 mm. That is, the average particle size of the sand type silica-based inorganic material may be about 16 to about 150 meshes.

In the case in which the average particle size of the sand type silica-based inorganic material is less than about 0.1 mm, the texture of natural stone may become unnoticeable, and in the case in which the average particle size is more than about 1.2 mm, the mechanical properties such as a surface hardness, and the like, may be deteriorated.

The resin-based reinforced natural stone chip composition may include the sand type silica-based inorganic material in an amount of about 40 to about 60 wt % based on the total weight (100 wt %) of the resin-based reinforced natural stone chip composition. In some embodiments, the resin-based reinforced natural stone chip composition may include the sand type silica-based inorganic material in an amount of about 40, 41, 42, 43, 44, 45, 46, 47, 48, 49, 50, 51, 52, 53, 54, 55, 56, 57, 58, 59, or 60 wt %. Further, according to some embodiments of the present invention, the amount of the sand type silica-based inorganic material can be in a range from about any of the foregoing amounts to about any other of the foregoing amounts.

The sand type silica-based inorganic material is included in an amount within the above-mentioned range, such that bonding strength with the unsaturated polyester resin and the mechanical properties may be improved, and the stereoscopic texture of natural stone may be effectively implemented.

The powder type silica-based inorganic material according to the present invention may implement the texture of natural stone while minimizing a use amount of the unsaturated polyester resin and be added in order to improve the mechanical properties by compacting the resin-based reinforced natural stone.

An average particle size of the powder type silica-based inorganic material may be less than about 45 μm. In exemplary embodiments, the average particle size (D50) of the powder type silica-based inorganic material can be about 6 to about 15 μm measured using a particle size analyzer.

The resin-based reinforced natural stone chip composition may include the powder type silica-based inorganic material in an amount of about 15 to about 35 wt % based on the total weight (100 wt %) of the resin-based reinforced natural stone chip composition. In some embodiments, the resin-based reinforced natural stone chip composition may include the powder type silica-based inorganic material in an amount of about 15, 16, 17, 18, 19, 20, 21, 22, 23, 24, 25, 26, 27, 28, 29, 30, 31, 32, 33, 34, or 35 wt %. Further, according to some embodiments of the present invention, the amount of the powder type silica-based inorganic material can be in a range from about any of the foregoing amounts to about any other of the foregoing amounts.

In the case in which the amount of the powder type silica-based inorganic material is less than about 15 wt %, it may not be easy to mold a product, and the mechanical properties may be deteriorated, and in the case in which the content is more than about 35 wt %, the amount of the unsaturated polyester resin required to form the product can be increased, such that a surface hardness may be deteriorated.

In order to manufacture the resin-based reinforced natural stone chip according to the present invention, a general curing agent may be further contained.

Examples of the curing agent may include without limitation organic peroxides such as benzoyl peroxide, lauroyl peroxide, butyl hydro peroxide, cumyl hydro peroxide, t-butyl peroxy benzoate, bis(butylperoxy)cyclododecane, dibutyl peroxide, and the like, and mixtures thereof.

Further, in order to promote a curing action of the present invention, a curing accelerator may be further contained. Examples of the curing accelerator may include without limitation one or a mixture of two or more naphthenic acid salts such as cobalt naphthenate, copper naphthenate, barium naphthenate, and the like; octenoic acid salts such as cobalt octenoate, manganese octenoate, zinc octenoate, vanadium octenoate, and the like; and the like, and mixtures thereof. In exemplary embodiments, a cobalt based curing accelerator can be used.

The curing agent can be used in an amount of about 1.5 to about 3 parts by weight based on about 100 parts by weight of the unsaturated polyester resin. In the case in which the amount is outside of the above-mentioned range, the curing may not be performed or the curing may be rapidly performed, such that it may be difficult to manufacture a uniform resin-based reinforced natural stone chip.

In addition, the resin-based reinforced natural stone chip according to the present invention may further include one or more general additive(s) as well as the above-mentioned components in order to achieve the desired physical properties and use. Examples of the additives can include without limitation crosslinking agents, organic/inorganic pigments, leveling agents, UV absorbers, storage stabilizers, polymerization inhibitors, flame retardants, antistatic agents, and the like, and mixtures thereof.

A surface hardness of the resin-based reinforced natural stone chip according to the present invention measured using Barcol hardness tester (GYZJ 934-1, Barber Colman) may be about 80 or more, and a surface roughness (Ra) thereof measured using a surface roughness tester (SJ-301, Mitutoyo) may be less than about 1 μm.

When the surface hardness and the surface roughness of the resin-based reinforced natural stone chip are in the above-mentioned ranges, at the time of forming the chip with a stereoscopic texture, the binder coating agent and the pigment may be uniformly coated without deteriorating the mechanical properties. Therefore, in exemplary embodiments, the surface hardness and the surface roughness are in the above-mentioned ranges.

The resin-based reinforced natural stone chip according to the present invention may be crushed by a general method and then used. The crushed resin-based reinforced natural stone chips according to the present invention may have an average particle size of about 5.0 to about 20.0 mm. In the case in which the average particle size of the crushed resin-based reinforced natural stone chips is less than about 5.0 mm, it can be difficult to form a three-dimensional stereoscopic texture, and in the case in which the average particle size is more than about 20.0 mm, at the time of manufacturing the resin-based reinforced natural stone, compaction may not be sufficiently performed, such that the mechanical properties may be deteriorated.

Further, in order to more effectively impart the stereoscopic texture and improve the mechanical properties, two kinds or more of resin-based reinforced natural stone chips having different average particle sizes may be mixed and used.

The chip with a stereoscopic texture for a resin-based reinforced natural stone according to the present invention may be obtained by uniformly coating the pigment on the crushed resin-based reinforced natural stone chip using the binder coating agent. As the binder coating agent, any resin may be applied without limitation as long as it may have excellent bonding strength with the resin-based reinforced natural stone chip and be uniformly coated on a surface of natural stone. In exemplary embodiments, a urethane-based resin and/or an acrylic resin may be effectively used.

The binder coating agent can have a weight average molecular weight of about 20,000 to about 70,000 g/mol. In the case in which the weight average molecular weight of the binder coating agent is less than about 20,000 g/mol, bonding strength with the resin-based reinforced natural stone chip can be weak, such that it can be difficult to uniformly coat the pigment, and in the case in which the weight average molecular weight of the binder coating agent is more than about 70,000 g/mol, the crushed resin-based reinforced natural stone chips may coagulate with each other.

The resin-based reinforced natural stone chip with a stereoscopic texture may include the binder coating agent in an amount of about 1 to about 3 parts by weight, for example about 1.5 to about 2.5 parts by weight, based on about 100 parts by weight of the resin-based reinforced natural stone chip. In some embodiments, the resin-based reinforced natural stone chip with a stereoscopic texture may include the binder coating agent in an amount of about 1, 1.5, 2, 2.5, or 3 parts by weight. Further, according to some embodiments of the present invention, the amount of the binder coating agent can be in a range from about any of the foregoing amounts to about any other of the foregoing amounts.

In the case in which the amount of the binder coating agent is less than about 1 part by weight, the pigment may not be uniformly coated, and in the case in which the amount is more than about 3 parts by weight, the resin-based reinforced natural stone chips may coagulate with each other, such that the pigment may not be uniformly coated.

As the pigment for forming the chip with a stereoscopic texture for a resin-based reinforced natural stone, at least one kind may be selected from organic and/or inorganic pigments generally used in the art. Examples of the pigment may include without limitation reddish brown pigments such as iron oxide, and the like, yellow pigments such as iron hydroxide, and the like, green pigments such as chromium oxide, and the like, deep blue pigments such as sodium aluminosilicate, and the like, white pigments such as titanium oxide, and the like, metal pearls, and the like, and mixtures thereof. Further, in order to improve dispersibility of the pigment and improve bonding strength with the resin-based reinforced natural stone chip, a coupling agent and/or a surfactant may be further contained.

The resin-based reinforced natural stone chip with a stereoscopic texture may include the pigment in an amount of about 0.5 to about 3 parts by weight, for example about 1.0 to about 2.5 parts by weight, based on about 100 parts by weight of the resin-based reinforced natural stone chip. In some embodiments, the resin-based reinforced natural stone chip with a stereoscopic texture may include the pigment in an amount of about 0.5, 1, 1.5, 2, 2.5, or 3 parts by weight. Further, according to some embodiments of the present invention, the amount of the pigment can be in a range from about any of the foregoing amounts to about any other of the foregoing amounts.

In the case in which the amount of the pigment is less than about 0.5 parts by weight, the pigment may not be sufficiently coated on the surface of the resin-based reinforced natural stone chip, and in the case in which the amount is more than about 3 parts by weight, the pigments may coagulate with each other, such that the pigment may be non-uniformly coated.

Resin-Based Reinforced Natural Stone Having Improved Stereoscopic Texture

Hereinafter, the resin-based reinforced natural stone having an improved stereoscopic texture, including the chip with a stereoscopic texture for a resin-based reinforced natural stone as described above will be described in detail.

The resin-based reinforced natural stone having an improved stereoscopic texture according to an exemplary embodiment of the present invention may include the chip with a stereoscopic texture for a resin-based reinforced natural stone as described above, an unsaturated polyester resin, and a silica-based inorganic material.

Chip with Stereoscopic Texture for Resin-Based Reinforced Natural Stone

The chip with a stereoscopic texture for a resin-based reinforced natural stone according to an exemplary embodiment of the present invention is to implement a three-dimensional stereoscopic texture by implementing a pattern like natural stone and emphasizing the saturation contrast and the boundary of the point pattern, and the above-mentioned chip with a stereoscopic texture for a resin-based reinforced natural stone according to the present invention may be used.

The resin-based reinforced natural stone composition may include a chip with a stereoscopic texture for a resin-based reinforced natural stone according to the present invention in an amount of about 1 to about 20 wt %, for example about 3 to about 15 wt %, based on 100 wt % of the resin-based reinforced natural stone composition. In some embodiments, the resin-based reinforced natural stone composition may include a chip with a stereoscopic texture in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the chip with a stereoscopic texture can be in a range from about any of the foregoing amounts to about any other of the foregoing amounts.

In the case in which the amount of the chip with a stereoscopic texture for a resin-based reinforced natural stone is less than about 1 wt %, the three-dimensional stereoscopic texture may become unnoticeable, and in the case in which the amount is more than about 20 wt %, mechanical properties may be deteriorated.

In addition, two or more kinds of chips with a stereoscopic texture for a resin-based reinforced natural stone having different colors may be mixed and used.

Unsaturated Polyester Resin

The unsaturated polyester resin according to an exemplary embodiment of the present invention, which forms a matrix of the resin-based reinforced natural stone, may be the unsaturated polyester resin used in the above-mentioned resin-based reinforced natural stone chip, but is not limited thereto.

The resin-based reinforced natural stone composition may include the unsaturated polyester resin in an amount of about 5 to about 15 wt %, for example about 6 to about 13 wt %, based on 100 wt % of the resin-based reinforced natural stone composition. In some embodiments, the resin-based reinforced natural stone composition may include an unsaturated polyester resin in an amount of about 5, 6, 7, 8, 9, 10, 11, 12, 13, 14, or 15 wt %. Further, according to some embodiments of the present invention, the amount of the unsaturated polyester resin can be in a range from about any of the foregoing amounts to about any other of the foregoing amounts.

In the case in which the amount of the unsaturated polyester resin is less than about 5 wt %, bonding strength with the silica-based inorganic material and the chip with a stereoscopic texture may be deteriorated, such that it may be difficult to form a product, and in the case in which the amount is more than about 15 wt %, the mechanical properties such as a surface hardness, and the like, may be deteriorated. Therefore, the unsaturated polyester resin is included in an amount within the above mentioned range, such that bonding strength with the silica-based inorganic material and the chip with a stereoscopic texture may be improved, and the three-dimensional stereoscopic texture of natural stone may be effectively implemented.

Silica-Based Inorganic Material

The silica-based inorganic material according to an exemplary embodiment of the present invention may be added in order to form an appearance and a texture close to those of natural stone and improve the mechanical properties.

As the silica-based inorganic material, any silica-based inorganic material may be used without limitation as long as it is obtained from nature. Examples of the silica-based inorganic material may include without limitation sand type silica-based inorganic materials, powder type silica-based inorganic materials, quartz chips, and the like, and mixtures thereof. The sand type silica-based inorganic materials, the powder type silica-based inorganic materials and the quartz chips are not the same.

The sand type silica-based inorganic material may have an average particle size of about 0.1 to about 1.2 mm, the powder type silica-based inorganic material may have an average particle size less than about 45 μm, and the quartz chip may have an average particle size of about 1 to about 9 mm.

As the silica-based inorganic materials having various sizes are mixed and used, the stereoscopic texture like natural stone may be effectively implemented, and the resin-based reinforced natural stone may be effectively compacted, such that the mechanical properties may be further improved.

In exemplary embodiments, the silica-based inorganic materials can include about 40 to about 55 wt % of the sand type silica-based inorganic material, about 22 to about 40 wt % of the powder type silica-based inorganic material, and about 10 to about 30 wt % of the quartz chip.

In some embodiments, the silica-based inorganic materials may include the sand type silica-based inorganic material in an amount of about 40, 41, 42, 43, 44, 45, 46, 47, 48, 49, 50, 51, 52, 53, 54, or 55 wt %. Further, according to some embodiments of the present invention, the amount of the sand type silica-based inorganic material can be in a range from about any of the foregoing amounts to about any other of the foregoing amounts.

In some embodiments, the silica-based inorganic materials may include the powder type silica-based inorganic material in an amount of about 22, 23, 24, 25, 26, 27, 28, 29, 30, 31, 32, 33, 34, 35, 36, 37, 38, 39, or 40 wt %. Further, according to some embodiments of the present invention, the amount of the powder type silica-based inorganic material can be in a range from about any of the foregoing amounts to about any other of the foregoing amounts.

In some embodiments, the silica-based inorganic materials may include the quartz chip in an amount of about 10, 11, 12, 13, 14, 15, 16, 17, 18, 19, 20, 21, 22, 23, 24, 25, 26, 27, 28, 29, or 30 wt %. Further, according to some embodiments of the present invention, the amount of the quartz chip can be in a range from about any of the foregoing amounts to about any other of the foregoing amounts.

The resin-based reinforced natural stone composition may include the silica-based inorganic material in an amount of about 70 to about 93 wt %, for example about 78 to about 91 wt %, based on 100 wt % of the resin-based reinforced natural stone composition. In some embodiments, the resin-based reinforced natural stone composition may include the silica-based inorganic material in an amount of about 70, 71, 72, 73, 74, 75, 76, 77, 78, 79, 80, 81, 82, 83, 83, 85, 86, 87, 88, 89, 90, 91, 92, or 93 wt %. Further, according to some embodiments of the present invention, the amount of the silica-based inorganic material can be in a range from about any of the foregoing amounts to about any other of the foregoing amounts.

In the case in which the amount of the silica-based inorganic material is less than about 70 wt %, the mechanical properties may be deteriorated, and in the case in which the amount is more than about 93 wt %, the amounts of the unsaturated polyester resin and the chip with a stereoscopic texture can be relatively decreased, such that it may be difficult to form a product due to a decrease in bonding strength between configuration components, and the three-dimensional stereoscopic effect may be insufficiently implemented.

Therefore, the silica-based inorganic material is included in an amount within the above mentioned range, such that bonding strength between the unsaturated polyester resin, the silica-based inorganic material, and the chip with a stereoscopic texture may be improved, and the three-dimensional stereoscopic texture of natural stone may be effectively implemented.

In order to manufacture the resin-based reinforced natural stone having an improved stereoscopic texture according to the present invention, a general curing agent may be further contained.

As the curing agent, an organic peroxide such as benzoyl peroxide, lauroyl peroxide, butyl hydro peroxide, cumyl hydro peroxide, t-butyl peroxy benzoate, bis(butylperoxy) cyclododecane, dibutyl peroxide, and the like, and mixtures thereof may be used, but the present invention is not limited thereto.

Further, in order to promote a curing action of the present invention, a curing accelerator may be further contained. For example, examples of the curing accelerator may include without limitation one or a mixture of two or more of naphthenic acid salts such as cobalt naphthenate, copper naphthenate, barium naphthenate, and the like; octenoic acid salts such as cobalt octenoate, manganese octenoate, zinc octenoate, vanadium octenoate, and the like; and the like, and mixtures thereof. In exemplary embodiments, a cobalt based curing accelerator may be used.

The curing agent can be used in an amount of about 1.5 to about 3 parts by weight based on about 100 parts by weight of the unsaturated polyester resin. In the case in which the amount is outside of the above-mentioned range, the curing may not be performed or the curing may be rapidly performed, such that it may be difficult to manufacture a uniform resin-based reinforced natural stone.

In addition, the resin-based reinforced natural stone having an improved stereoscopic texture according to the present invention may further include one or more general additive(s) as well as the above-mentioned components in order to achieve the desired physical properties and use. Examples of the additive may include without limitation crosslinking agents, organic/inorganic pigments, leveling agents, UV absorbers, storage stabilizers, polymerization inhibitors, flame retardants, an antistatic agents, and the like, and mixtures thereof.

A surface hardness of the resin-based reinforced natural stone having an improved stereoscopic texture according to the present invention measured using Barcol hardness tester (GYZJ 934-1, Barber Colman) may be about 80 to about 90, and a surface roughness (Ra) thereof measured using a surface roughness tester (SJ-301, Mitutoyo) may be less than about 1.0 μm.

Further, the resin-based reinforced natural stone having an improved stereoscopic texture according to the present invention has an advantage in that the three-dimensional stereoscopic texture may be implemented by emphasizing a boundary of a point pattern for implementing the stereoscopic effect. In addition, the resin-based reinforced natural stone having an improved stereoscopic texture according to the present invention has an advantage in that moisture resistance and contamination resistance may be improved due to excellent mechanical properties and flatness.

Method of Manufacturing Resin-Based Reinforced Natural Stone Having Improved Stereoscopic Texture The method of manufacturing a resin-based reinforced natural stone having an improved stereoscopic texture according to the present invention, the method may include:

manufacturing a resin-based reinforced natural stone chip;

manufacturing a chip with a stereoscopic texture for a resin-based reinforced natural stone using the resin-based reinforced natural stone chip; and manufacturing a resin-based reinforced natural stone having an improved stereoscopic texture by including the chip with a stereoscopic texture for a resin-based reinforced natural stone, an unsaturated polyester resin, and a silica-based inorganic material.

In exemplary embodiments, the method may include:
(a) preparing a resin-based reinforced natural stone chip composition including about 10 to about 30 wt % of an unsaturated polyester resin, about 40 to about 60 wt % of a sand type silica-based inorganic material, and about 15 to about 35 wt % of a powder type silica-based inorganic material;

(b) manufacturing a resin-based reinforced natural stone chip by curing and crushing the resin-based reinforced natural stone chip composition;

(c) manufacturing a chip with a stereoscopic texture for a resin-based reinforced natural stone by mixing the resin-based reinforced natural stone chip with a binder coating agent and a pigment;

(d) preparing a resin-based reinforced natural stone composition by mixing about 1 to about 20 wt % of the chip with a stereoscopic texture for a resin-based reinforced natural stone, about 5 to about 15 wt % of an unsaturated polyester resin, and about 70 to about 93 wt % of a silica-based inorganic material; and (e) manufacturing a resin-based reinforced natural stone by vibration-compression molding the resin-based reinforced natural stone composition.

In step (a), the sand type silica-based inorganic material, various additives, and the unsaturated polyester resin may be mixed with each other, and then, a pigment, a curing agent, and the powder type silica-based inorganic material may be sequentially injected thereto, but the present invention is not limited thereto. As a mixing method, a mixing method known in the art may be used.

In step (b), in order to cure the resin-based reinforced natural stone chip, the curing may be performed at a temperature of about 80 to about 90° C. for about 40 to about 120 minutes. Since the resin-based reinforced natural stone chip may be obtained without deteriorating mechanical properties, it is effective that the curing is performed under the above-mentioned conditions.

In step (c), a curing temperature is not limited as long as the binder coating agent may be cured, but it is effective that the curing is performed at about 90 to about 150° C. for about 20 to about 30 minutes.

In the case in which the curing temperature is less than about 90° C. or a curing time is less than about 20 minutes, the binder coating agent may not be sufficiently cured, such that the three-dimensional stereoscopic texture may be insufficiently implemented, and the case in which the curing temperature is more than about 150° C. or the curing time can be more than about 30 minutes, bonding strength between the pigment and the resin-based reinforced natural stone chip may be deteriorated due to degradation of the binder coating agent, such that it may be difficult to uniformly coat the pigment.

The resin-based reinforced natural stone composition prepared in step (d) is uniformly distributed using dispersion equipment so as to maintain a predetermined shape and then compression-molded in step (e), thereby making it possible to manufacture the resin-based reinforced natural stone having an improved stereoscopic texture. The compression-molding in step (e) may be performed in a vibration or vacuum-vibration state.

Hereinafter, the following Examples will be provided in order to describe the present invention in more detail. However, the present invention is not limited to Examples below.

Measurement of Physical Properties (1) Surface Hardness

Barcol hardness at a chip interface is measured using a Barcol hardness tester (GYZJ 934-1, Barber Colman) according to ASTM D 2583 standard.

(2) Surface Roughness

Surface roughness (Ra, unit: μm) is measured using a surface roughness tester (SJ-301, Mitutoyo) according to JIS 2001 standard.

(3) Stereoscopic Texture

A surface of a resin-based reinforced natural stone according to the present invention is observed by the naked eye. The case in which a boundary with a chip with a stereoscopic texture is distinguished and a three-dimensional stereoscopic texture like natural stone is prominently shown is evaluated as "good", and the opposite case is evaluated as "bad".

Specifications of each of the components used in the following Examples and Comparative Examples are as follows.

(A) Unsaturated Polyester Resin

ATM 100 (Aekyung Chem.) is used.

(B) Sand Type Silica-Based Inorganic Material

Silica sands (Kale Maden) having average particle sizes of about 0.1 to 0.3 mm and about 0.3 to 1.2 mm, respectively, are used.

(C) Powder Type Silica-Based Inorganic Material

Silica Powder (21 Century Silica) having an average particle size less than about 45 μm is used.

(D) Quartz Chip

A quartz chip (21 Century Silica) having an average particle size of about 1.2 to 9.0 mm is used.

(E) Curing Agent

Luperox P (Arkema) is used.

(F) Curing Accelerator

6%-cobalt (Jinyangchem) is used.

(G) Crosslinking Agent

WD-70 silane-based coupling agent (Gudam) is used.

(H) Pigment

318M, TR92, Y3910, Y8G, Y6R, and Red110 (Wooshin pigment) are used.

(I) Binder Coating Agent

SA-261 (acrylic resin containing 50% volatile component, Aekyung Chem.) is used.

Manufacturing Example 1

Manufacturing of Resin-Based Reinforced Natural Stone Chip

As shown in the following Table 1, based on 100 parts by weight of a mixture containing about 25 wt % of the unsaturated polyester resin (A), about 45 wt % of the sand type silica-based inorganic material (B), and about 30 wt % of the powder type silica-based inorganic material (C), a composition containing about 0.5 parts by weight of the curing agent (E), about 0.05 parts by weight of the curing accelerator (F), about 0.25 parts by weight of the crosslinking agent (G), and about 1 part by weight of the pigment (H) is used. First, the sand type silica-based inorganic material is injected into a general mixer, and an unsaturated polyester resin composition containing the curing accelerator and the crosslinking agent is injected thereinto and mixed with each other. Next, the pigment, the curing agent, and the powder type silica-based inorganic material are sequentially injected thereinto and mixed therewith, thereby preparing a resin-based reinforced natural stone chip composition. The composition is put into a plate mold and cured at about 80° C. for about 1 hour, thereby manufacturing a resin-based reinforced natural stone plate. Thereafter, the manufactured plate is put into a crusher and crushed so that an average particle size became about 5 to 20 mm, thereby manufacturing a resin-based reinforced natural stone chip.

Manufacturing of Chip with Stereoscopic Texture

After 100 parts by weight of the crushed resin-based reinforced natural stone chip is injected into a general mixer, and about 1.5 parts by weight of the binder coating agent (I) is injected thereinto and mixed with each other, about 1 part by weight of the pigment (H) is injected thereinto and mixed with each other again. The mixture is widely applied into a mold having a predetermined shape and cured (dried) at about 120° C. for about 20 minutes, thereby manufacturing the chip with a stereoscopic texture.

Manufacturing Examples 2 and 5

Chips with a stereoscopic texture are manufactured by the same method as in Manufacturing Example 1 except for changing the amounts of the sand type silica-based inorganic material (B) and the powder type silica-based inorganic material (C) as shown in the following Table 1.

Manufacturing Examples 3 and 6

Chips with a stereoscopic texture are manufactured by the same method as in Manufacturing Example 1 except for changing the amounts of the unsaturated polyester resin (A), the sand type silica-based inorganic material (B), and the powder type silica-based inorganic material (C) as shown in the following Table 1.

Manufacturing Examples 4, 7, and 8

Chips with a stereoscopic texture are manufactured by the same method as in Manufacturing Example 1 except for changing the amount of the binder coating agent (I) as shown in the following Table 1.

Example 1

Manufacturing of Resin-Based Reinforced Natural Stone

As shown in the following Table 2, based on 100 parts by weight of a mixture containing about 10 wt % of the unsaturated polyester resin (A), about 45 wt % of the sand type silica-based inorganic material (B), about 25 wt % of the powder type silica-based inorganic material (C), about 13 wt % of the quartz chip (D), and about 7 wt % of the chip with a stereoscopic texture in Manufacturing Example 1, a composition containing about 0.2 parts by weight of the curing agent (E), about 0.02 parts by weight of the curing accelerator (F), about 0.1 parts by weight of the crosslinking agent (G), and about 1 part by weight of the pigment (H) is mixed in a general mixture, thereby preparing a resin-based reinforced natural stone composition. After the composition is put into a mold and allowed to be uniform, vibration and compression are applied thereto, such that the composition is uniformly distributed in the entire mold.

The uniformly distributed composition is compression molded using a press, and then the curing and surface polishing treatment are performed thereon, thereby manufacturing a resin-based reinforced natural stone.

Examples 2 to 4

Resin-based reinforced natural stones are manufactured by the same method as in Example 1 except for using the chips with a stereoscopic texture in [Manufacturing Examples 2 to 4] instead of using the chip with a stereoscopic texture in [Manufacturing Example 1] as shown the following Table 2.

Comparative Example 1

A resin-based reinforced natural stone is manufactured by the same method as in Example 1 except that the chip with a stereoscopic texture is not used but the unsaturated polyester resin (A) and the quartz chip (D) are further used by about 5 wt % and 2 wt %, respectively, as shown in the following Table 2.

Comparative Examples 2 to 5

Resin-based reinforced natural stones are manufactured by the same method as in Example 1 except for using the chips with a stereoscopic texture in [Manufacturing Examples 5 to 8] instead of using the chip with a stereoscopic texture in [Manufacturing Example 1] as shown the following Table 2.

Comparative Examples 6 and 7

Resin-based reinforced natural stones are manufactured by the same method as in Example 1 except for changing the amounts of the quartz chip (D) and the chip with a stereoscopic texture in Manufacturing Example 1 as shown in the following Table 2.

TABLE 1

Chip with Stereoscopic Texture

| | Unsaturated Polyester Resin (wt %) | Sand Type Silica-Based Inorganic Material (wt %) | Powder Type Silica-Based Inorganic Material (wt %) | Binder Coating Agent (Part by Weight) | Pigment (Part by Weight) |
|---|---|---|---|---|---|
| Manufacturing Example 1 | 25 | 45 | 30 | 1.5 | 2.0 |
| Manufacturing Example 2 | 25 | 55 | 20 | 1.5 | 2.0 |
| Manufacturing Example 3 | 20 | 60 | 20 | 1.5 | 2.0 |
| Manufacturing Example 4 | 25 | 45 | 30 | 2.5 | 2.0 |
| Manufacturing Example 5 | 25 | 65 | 10 | 1.5 | 2.0 |
| Manufacturing Example 6 | 35 | 40 | 25 | 1.5 | 2.0 |
| Manufacturing Example 7 | 25 | 45 | 30 | 4.0 | 2.0 |
| Manufacturing Example 8 | 25 | 45 | 30 | 0.5 | 2.0 |

TABLE 2

Resin-Based Reinforced Natural Stone

|   | Unsaturated Polyester Resin (wt %) | Sand Type Silica-Based Inorganic Material (wt %) | Powder Type Silica-Based Inorganic Material (wt %) | Quartz Chip (wt %) | Chip with Stereoscopic Texture | (wt %) |
|---|---|---|---|---|---|---|
| Example 1 | 10 | 45 | 25 | 13 | Manufacturing Example 1 | 7 |
| Example 2 | 10 | 45 | 25 | 13 | Manufacturing Example 2 | 7 |
| Example 3 | 10 | 45 | 25 | 13 | Manufacturing Example 3 | 7 |
| Example 4 | 10 | 45 | 25 | 13 | Manufacturing Example 4 | 7 |
| Comparative Example 1 | 15 | 45 | 25 | 15 | — | — |
| Comparative Example 2 | 10 | 45 | 25 | 13 | Manufacturing Example 5 | 7 |
| Comparative Example 3 | 10 | 45 | 25 | 13 | Manufacturing Example 6 | 7 |
| Comparative Example 4 | 10 | 45 | 25 | 13 | Manufacturing Example 7 | 7 |
| Comparative Example 5 | 10 | 45 | 25 | 13 | Manufacturing Example 8 | 7 |
| Comparative Example 6 | 10 | 45 | 10 | 10 | Manufacturing Example 1 | 25 |
| Comparative Example 7 | 10 | 45 | 25 | 19.5 | Manufacturing Example 1 | 0.5 |

TABLE 3

Measurement Results of Physical Properties

|   | Surface Hardness (Barcol Hardness) | Surface Roughness (Ra, μm) | Stereoscopic Texture |
|---|---|---|---|
| Example 1 | 81 | 0.82 | Good |
| Example 2 | 80 | 0.78 | Good |
| Example 3 | 87 | 0.45 | Good |
| Example 4 | 83 | 0.93 | Good |
| Comparative Example 1 | 60 | 7.54 | Bad |
| Comparative Example 2 | 75 | 2.83 | Bad |
| Comparative Example 3 | 67 | 4.52 | Bad |
| Comparative Example 4 | 79 | 3.91 | Bad |
| Comparative Example 5 | 80 | 0.78 | Bad |
| Comparative Example 6 | 50 | 10.58 | Bad |
| Comparative Example 7 | 82 | 0.95 | Bad |

FIGS. 1(a)-(d) are digital photographs of resin-based reinforced natural stones manufactured according to Examples 1-4, respectively, of the present invention.

As shown in FIGS. 1(a)-(d), it may be appreciated that in the resin-based reinforced natural stones according to Examples 1 to 4, a boundary with a matrix is emphasized using the chip with a stereoscopic texture as a point chip, such that a three-dimensional stereoscopic texture may be significantly implemented.

In contrast, it may be appreciated that in Comparative Example 1 in which the chip with a stereoscopic texture is not used, a stereoscopic texture property is significantly deteriorated, and the surface hardness and the surface roughness are also decreased.

In addition, it may be appreciated that in the case in which the amount of the sand type silica-based inorganic material or the unsaturated polyester resin is excessively high as in Comparative Examples 2 and 3, the surface hardness and the surface roughness are also decreased, and the stereoscopic texture property is also deteriorated.

In the case in which the chip with a stereoscopic texture is excessively used as in Comparative Example 6, the surface hardness and the surface roughness are also decreased in accordance with a surface defect, and the stereoscopic texture property is also deteriorated. In the case in which a small amount of chip with a stereoscopic texture is used as in Comparative Example 7, the stereoscopic texture property is not suitably expressed.

In the chip with a stereoscopic texture for a resin-based reinforced natural stone and the resin-based reinforced natural stone including the same according to the present invention, the three-dimensional stereoscopic texture may be implemented by implementing the pattern like natural stone and emphasizing the saturation contrast and the boundary of the point pattern without performing the separate surface polishing process for implementing the stereoscopic effect.

In addition, the resin-based reinforced natural stone including the chip with a stereoscopic texture for a resin-based reinforced natural stone according to the present invention can have excellent mechanical properties and flatness, such that moisture resistance and contamination resistance may be improved.

Hereinabove, although the present invention is described by reference to the exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and all modified equally or equivalently to the claims as well as the following claims are intended to fall within the scope and spirit of the invention.

What is claimed is:

1. A chip with a stereoscopic texture for a resin-based reinforced natural stone, the chip comprising:
- a resin-based reinforced natural stone chip formed of a cured mixture comprising about 10 to about 30 wt % of an unsaturated polyester resin, about 40 to about 60 wt % of a sand type silica-based inorganic material having an average particle size of about 0.1 to about 1.2 mm, and about 15 to about 35 wt % of a powder type silica-based inorganic material having an average particle size less than about 45 µm;
- a binder coating agent; and
- a pigment,
- wherein the binder coating agent and the pigment are coated on a surface of the resin-based reinforced natural stone chip.

2. The chip of claim 1, comprising about 1 to about 3 parts by weight of the binder coating agent and about 0.5 to about 3 parts by weight of the pigment, based on about 100 parts by weight of the resin-based reinforced natural stone chip.

3. The chip of claim 1, wherein the resin-based reinforced natural stone chip has an average particle size of about 5.0 to about 20.0 mm.

4. The chip of claim 1, wherein the binder coating agent is an acrylic resin, an urethane-based resin, or a mxiture thereof, and has a weight average molecular weight of about 20,000 to about 70,000 g/mol.

5. The chip of claim 1, wherein the resin-based reinforced natural stone chip has a surface hardness (Barcol hardness) of about 80 or more and a surface roughness (Ra) less than about 1 µm.

6. The chip of claim 1, wherein the powder type silica-based inorganic material has an average particle size of about 6 µm to about 15 µm.

7. A resin-based reinforced natural stone having an improved stereoscopic texture, the resin-based reinforced natural stone comprising:
- about 1 to about 20 wt % of the chip with a stereoscopic texture for a resin-based reinforced natural stone of claim 1;
- about 5 to about 15 wt % of an unsaturated polyester resin; and
- about 70 to about 93 wt % of a silica-based inorganic material.

8. The resin-based reinforced natural stone of claim 7, wherein the silica-based inorganic material includes:
- a sand type silica-based inorganic material having an average particle size of about 0.1 to about 1.2 mm;
- a powder type silica-based inorganic material having an average particle size less than about 45 µm; and
- a quartz chip having an average particle size of about 1 to about 9 mm.

9. The resin-based reinforced natural stone of claim 7, further comprising a curing agent, a curing accelerator, a crosslinking agent, an organic/inorganic pigment, a leveling agent, a UV absorber, a storage stabilizer, a polymerization inhibitor, a frame retardant, an antistatic agent, or a mixture thereof.

10. The resin-based reinforced natural stone of claim 7, having a surface hardness (Barcol hardness) of about 80 to about 90 and a surface roughness (Ra) less than about 1.0 µm.

* * * * *